United States Patent [19]
Nix et al.

[11] Patent Number: 6,148,614
[45] Date of Patent: Nov. 21, 2000

[54] DAMPER WITH INTEGRAL BRACKET

[75] Inventors: Richard A. Nix, Ortonville; Scott Lee Loring, Lapeer, both of Mich.

[73] Assignee: Automotive Products (USA), Inc., Auburn Hills, Mich.

[21] Appl. No.: 09/097,064

[22] Filed: Jun. 12, 1998

[51] Int. Cl.[7] ........................................... F15B 7/10
[52] U.S. Cl. ...................... 60/592; 92/98 R; 92/169.1; 92/161; 192/109 F; 138/30
[58] Field of Search ................. 60/592; 92/98 R, 92/161, 169.1; 138/26, 30; 192/109 F

[56] References Cited

U.S. PATENT DOCUMENTS

| | | |
|---|---|---|
| 4,798,129 | 1/1989 | Staub, Jr. ............................... 92/169.1 |
| 4,998,609 | 3/1991 | Nix et al. . |
| 5,016,523 | 5/1991 | Bowyer ................................... 92/161 |
| 5,070,983 | 12/1991 | Leigh-Monstevens et al. . |
| 5,320,203 | 6/1994 | Wilber et al. . |

*Primary Examiner*—Edward K. Look
*Assistant Examiner*—Hermes Rodriguez
*Attorney, Agent, or Firm*—Young & Basile, P.C.

[57] ABSTRACT

A damper for use with a hydraulic actuator of the type including a master cylinder and a slave cylinder with a conduit interconnecting the outlet of the master cylinder and the inlet of the slave cylinder. The damper is positioned in the conduit between the master cylinder and the slave cylinder and includes a housing member defining a chamber opening in one face of the housing member and a mounting bracket plate. The mounting bracket plate includes a housing portion corresponding in size and configuration to the one face of the housing member and is positioned against the one face of the housing member to coact with the housing member to seal the chamber. The bracket plate further includes a bracket portion extending outwardly from the housing portion in the form of mounting arms which are utilized to facilitate mounting of the damper to a fixed vehicle structure. A diaphragm is fixedly positioned in the chamber and divides the chamber into a first chamber portion between one side of the diaphragm and the housing member and a second chamber portion between the opposite side of the diaphragm and the housing portion of the bracket plate. This construction enables a single member to function to define the damper diaphragm chamber and further define the mounting bracket to secure the damper within the vehicle.

10 Claims, 3 Drawing Sheets

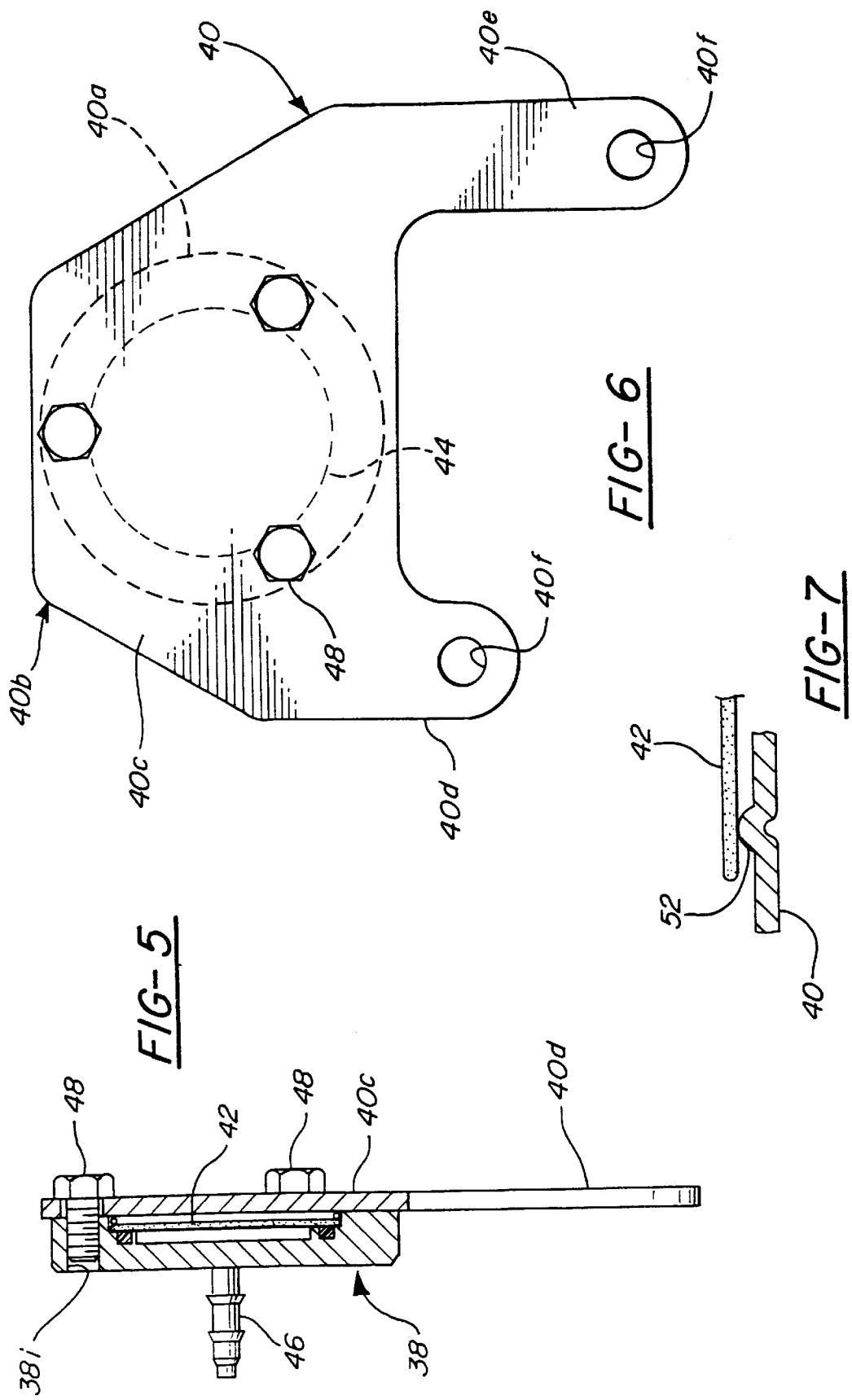

DAMPER WITH INTEGRAL BRACKET

BACKGROUND OF THE INVENTION

This invention relates to hydraulic clutch actuators and more particularly to hydraulic clutch actuators employing a damper mechanism.

Hydraulic actuators are known for operating a mechanism at a remote location by way of a master cylinder connected to a slave cylinder installed at the remote location. A conduit interconnects the master cylinder and the slave cylinder and the hydraulic apparatus is filled with hydraulic fluid such that, when the piston of the master cylinder is actuated, the piston of the slave cylinder and consequently the piston rod or output member is simultaneously actuated by displacement of the hydraulic fluid from the master cylinder to the slave cylinder through the conduit.

More particularly, it is known to provide such a hydraulic actuator for operating the clutch of a motor vehicle so that, when the clutch pedal of the vehicle is depressed by the driver, the slave cylinder is actuated to operate the clutch in known manner. Preferably, as described in U.S. Pat. No. 4,599,860 assigned to the assignee of the present invention, the clutch actuator is provided to the motor vehicle manufacturer in an assembled, prefilled form to simplify installation of the actuator on the vehicle, avoid the inconvenience of potential spillage of hydraulic fluid during on-line filling, eliminate the necessity to bleed or purge the lines of the actuator to facilitate the filling process, and eliminate the need to test the actuator after installation and filling. Whereas hydraulic clutch actuators, and particularly prefilled clutch actuators, have enjoyed significant commercial success, they have the tendency to transmit vibrations backwardly through the system from the clutch to the clutch pedal with the result that the operator may experience unpleasant vibrations at the clutch pedal.

Specifically, imbalances in the crankshaft of the vehicle engine, or engine firing impulses are transmitted to the fly wheel which undergoes a swashing movement, the fly wheel swashing movement in turn leads to vibrations of the spring fingers of the clutch release mechanism, the vibrations of the spring fingers are transferred to the release bearing of the clutch, and the vibrations propagate backwardly through the hydraulic fluid in the slave cylinder, through the hydraulic fluid and the conduit interconnecting the slave cylinder and the master cylinder, through the hydraulic fluid in the master cylinder, and then through the master cylinder push rod to the clutch pedal where they are experienced by the operator as vibrations of the clutch pedal. The propagated vibrations also generate a pedal growl which is audible to the operator as well as a clutch roar which may also be audible to the operator.

Various devices have been proposed in an attempt to attenuate these vibrations. For example, tuned masses have been attached to various parts of the clutch system including the clutch release lever, the slave cylinder push rod, and the clutch pedal. Rubber dampers have also been employed in the master cylinder push rod, rubber hose sections have been employed in the conduit interconnecting the master cylinder and the slave cylinder, and various damper devices have been proposed for installation in the interconnecting conduit. In particular, a damper device as shown in British patent specification 1,562,709, and assigned to the assignee of the present invention, may be installed in the conduit interconnecting the master cylinder and the slave cylinder. Alternatively, one of the damper devices disclosed in U.S. Pat. Nos. 4,998,609, 5,070,985, or 5,320,203, each assigned to the assignee of the present invention, may be installed in the interconnecting conduit.

Whereas these prior art damper devices have been successful in varying degrees in attenuating the vibrations in the systems, they have each suffered from one or more shortcomings. Specifically, the prior art devices have been unduly expensive; or they have actually introduced vibrations into the system by virtue of a hysteresis effect; or they have required a package size that has complicated their installation and placement in the crowded under-hood environment of a modern day motor vehicle; or they have been difficult to selectively adjust to accommodate varying vehicular applications; or they have exhibited a relatively short useful product life.

SUMMARY OF THE INVENTION

This invention is directed to the provision of an improved damper device for use in association with a hydraulic clutch actuator.

More particularly, this invention is directed to the provision of an improved damper device for use in association with a hydraulic clutch actuator which is extremely simple and inexpensive in construction.

The damper of the invention is specifically intended for use in a vehicular hydraulic clutch actuator system between a master cylinder and a slave cylinder of the system. The damper includes a housing member defining a chamber opening in one face of the housing member and accessible via a port in the housing member; a mounting bracket including a housing portion corresponding in size and configuration to the one face of the housing member and positioned against the one face of the housing member to coact with the housing member to seal the chamber and a bracket portion extending outwardly from the housing portion and including attachment means to facilitate mounting of the damper to a fixed structure of the vehicle; and a diaphragm fixedly positioned in the chamber and dividing the chamber into a first chamber portion between one side of the diaphragm and the housing member and communicating with the port and a second chamber portion between the opposite side of the diaphragm and the housing portion of the bracket plate. This construction minimizes the number of parts required to form the damper and simplifies construction of the damper, whereby to minimize the cost of the damper.

According to a further feature of the invention, the mounting bracket plate is fixedly secured to the housing member by a plurality of fastener devices joining the housing member to the housing portion of the mounting bracket plate. The fastener devices comprise a plurality of threaded bores in the housing member in surrounding relation to the chamber and a corresponding plurality of bolts passing through apertures in the housing portion of the mounting plate for engagement with respective threaded bores in the housing member. This specific fastener arrangement simplifies the construction of the damper and further minimizes the damper cost.

According to a further feature of the invention, the housing member and the housing portion of the bracket member have a circular configuration and the bracket portion of the mounting plate extends radially outwardly from the housing portion at circumferentially spaced locations. This arrangement allows the mounting of the bracket portion to the fixed vehicular structure at spaced locations.

According to a further feature of the invention, the damper is supplied as a part of a clutch hydraulic actuator system and the actuator system is provided to the motor vehicle manufacturer in prefilled form with hydraulic fluid filling the fluid volumes in the master cylinder, slave cylinder, and damper. Supply of the master cylinder, damper, and slave cylinder to the motor vehicle manufacturer in prefilled form greatly simplifies the assembly of the associated vehicle.

The invention also teaches a method of providing a damper to dampen vibrations occurring in hydraulic fluid in a hydraulic actuator system for a vehicle. According to the invention method, a housing member is provided defining a chamber opening in one face of the housing member and accessible by a port in the housing member; a mounting bracket plate is provided including a housing portion corresponding in size and configuration to the one face of the housing member and a bracket portion extending outwardly from the housing portion and including attachment means; the housing portion of the mounting bracket is positioned against the one face of the housing member to coact with the housing member to seal the chamber; a diaphragm is fixedly positioned in the chamber to divide the chamber into a first chamber portion between one side of the diaphragm and the housing member and communicating with the housing member port and a second chamber between the opposite side of the diaphragm and the housing portion of the bracket plate; and the bracket portion of the mounting plate is positioned against a fixed portion of the associated vehicle; and the mounting bracket plate is mounted to the fixed vehicle portion to fixedly position the damper with respect to the vehicle. This methodology simplifies the construction of the damper and simplifies the installation of the damper in a motor vehicle.

BRIEF DESCRIPTION OF THE DRAWINGS

FIG. 5 is a cross sectional view taken on line 5—5 of FIG. 3;

FIG. 6 is a view of a mounting bracket plate employed in the damper; and

FIG. 7 is a fragmentary view of a modified damper construction.

DETAILED DESCRIPTION OF THE PREFERRED EMBODIMENT

Figure 1:
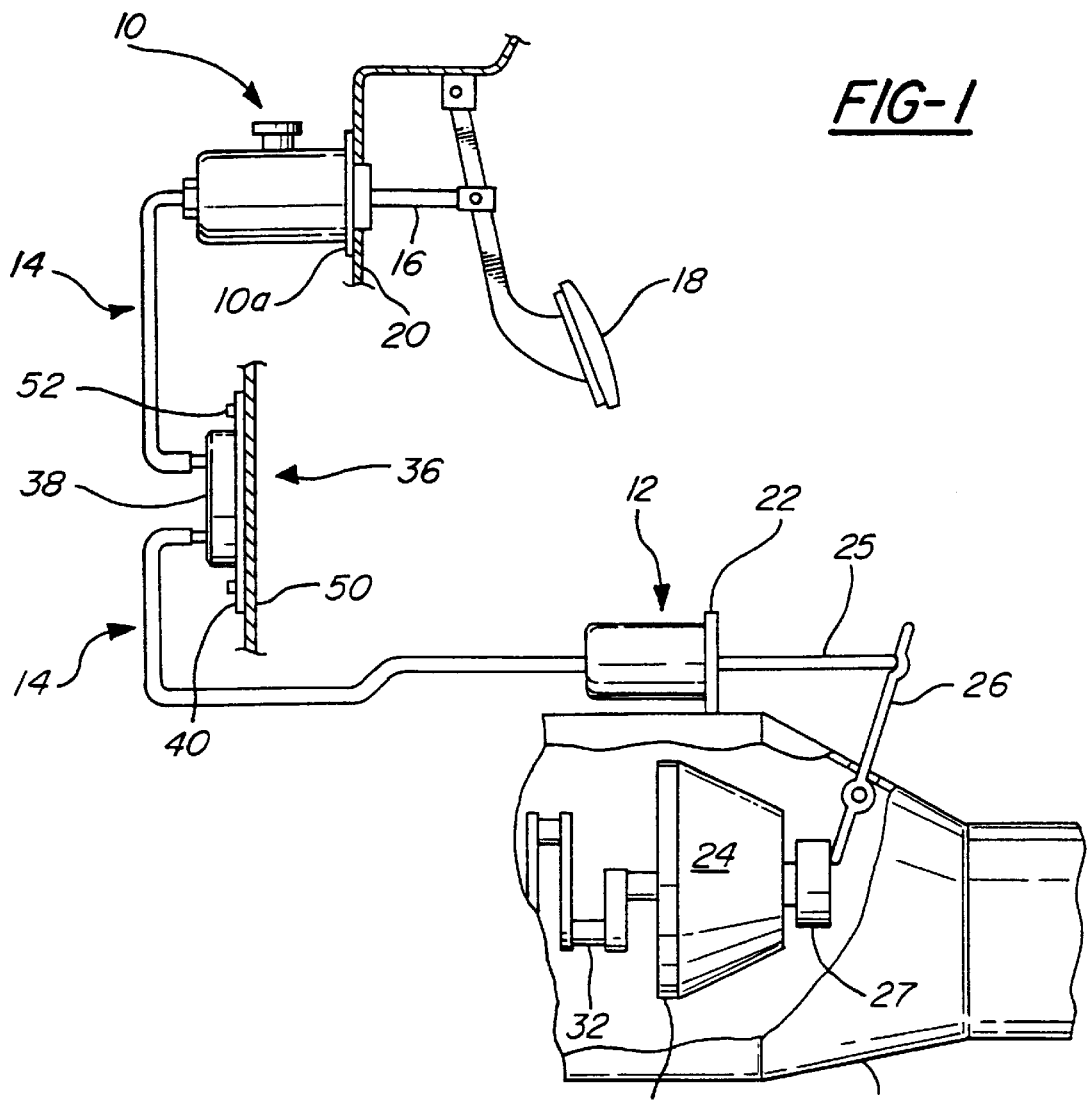
FIG. 1 is a somewhat schematic view of a vehicular hydraulic clutch actuator employing the invention damper.
Figure 2:
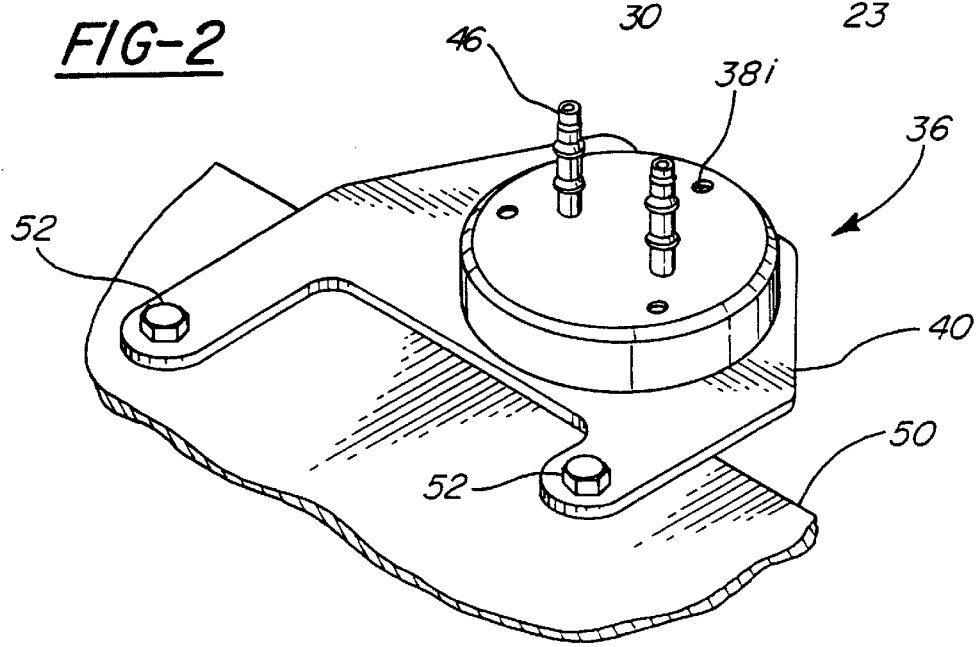
FIG. 2 is a perspective view of the damper.
Figure 3:
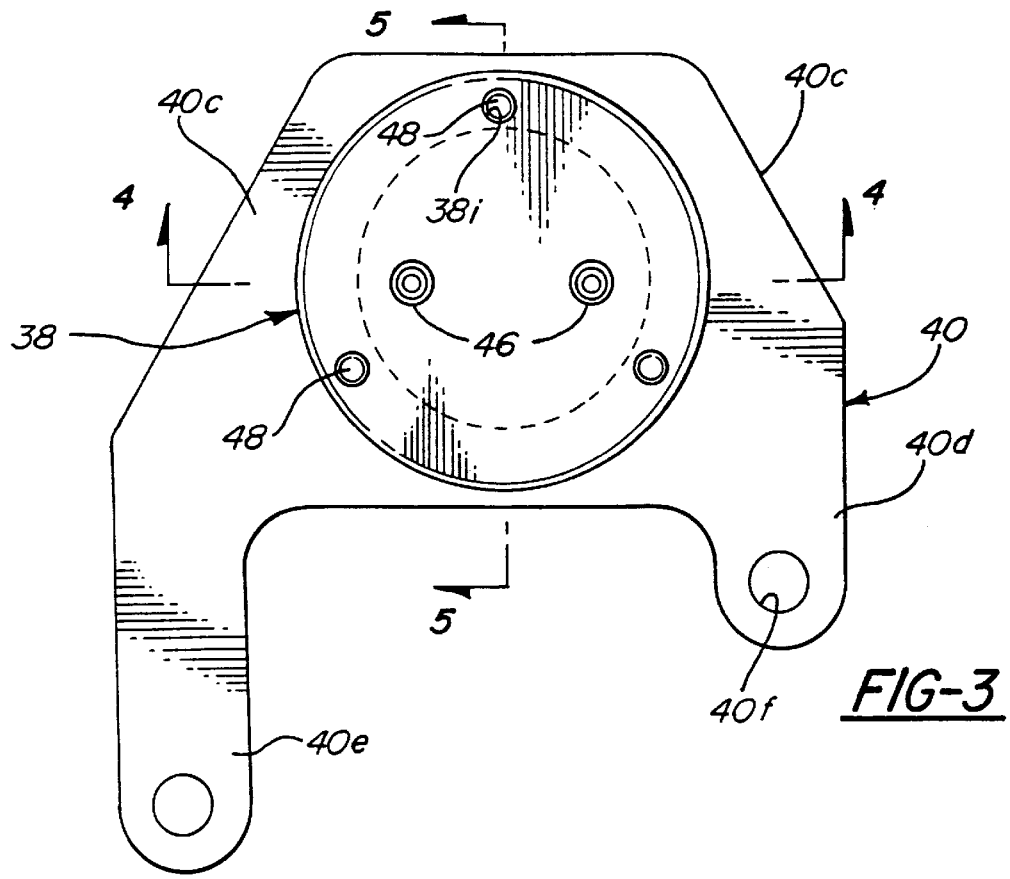
FIG. 3 is a top view of the damper.
Figure 4:
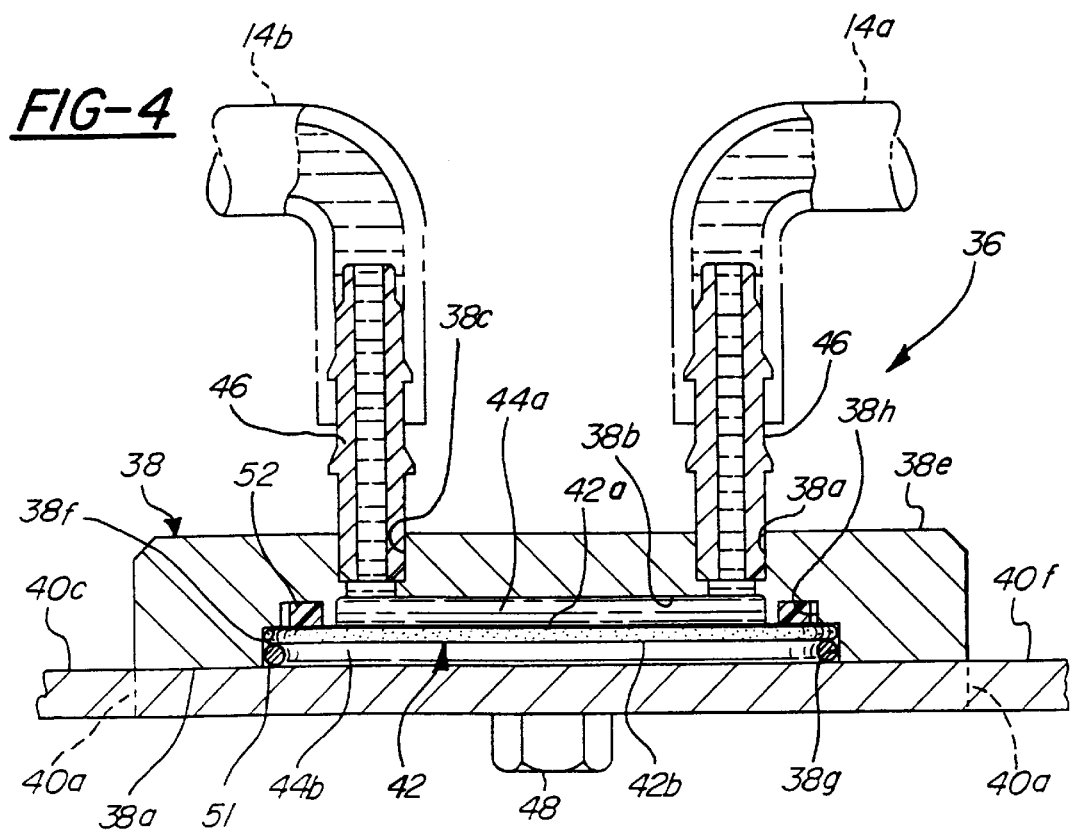
FIG. 4 is a cross sectional view taken on line 4—4 of FIG. 3.

The hydraulic clutch actuator shown schematically in FIG. 1 includes a master cylinder 10, a slave cylinder 12, and a conduit 14 extending between the outlet or discharge of the master cylinder and the inlet of the slave cylinder.

Master cylinder 10 includes an input rod 16 connected in known manner to the clutch pedal 18 of an associated motor vehicle so that pivotal movement of the clutch pedal by the vehicle operator moves a piston of the master cylinder in known manner to discharge pressure fluid from the cylinder. Cylinder 10 further includes a flange 10a to facilitate attachment of the master cylinder to the fire wall 20 of the vehicle.

Slave cylinder 12 is secured as by a bracket 22 to the bell housing 23 enclosing the clutch 24 of the vehicle and includes an output rod 25 coacting in known manner with a clutch release lever 26 so that pivotal movement of clutch pedal 18 by the operator results in discharge of pressure fluid from master cylinder 10 for conveyance through conduit 14 to slave cylinder 12 to provide extension of output rod 25 and pivotal movement of release lever 26 to move the clutch release bearing 27 in a direction to disengage the clutch 24. Clutch 24 is driven in known manner by a fly wheel 30 which in turn is driven by an engine crankshaft 32.

The invention damper assembly 36 is interposed in conduit 14 and is connected to the outlet of master cylinder 10 by a conduit portion 14a and to the inlet of slave cylinder 12 by a conduit portion 14b.

Damper assembly 36 (FIGS. 2–6) includes a housing member 38, a bracket mounting plate 40, and a diaphragm 42.

Housing member 38 may be formed, for example, of suitable steel in a screw machine process and has a generally circular, disc configuration.

Housing member 38 defines a circular chamber or cavity 44 opening in a face 38a of the housing member and bounded by a circular interior surface 38b of the housing member. A pair of spaced ports 38c and 38d extend through the housing member in spaced relation and open in a face 38e of the housing member opposite face 38a. It will be seen that ports 38c and 38d provide communication between chamber 44 and the exterior of the housing member. A fitting 46, formed for example of steel, is positioned in each port 38c, 38d and is fixedly secured to the housing member as by brazing.

Housing member 38 further defines an annular shoulder 38f, an annular wall 38g extending from shoulder 38f to housing face 38a, and an annular square cut groove 38h opening in shoulder 38f.

Mounting bracket plate 40 is formed as a flat steel member and includes a circular housing portion 40a corresponding in size and configuration to face 38a of housing member 38 and a bracket portion 40b extending outwardly from housing portion 40a and including a main body portion 40c, a short arm portion 40d, and a long arm portion 40e.

Diaphragm 42 is formed, for example, of a thin spring steel material, has a circular configuration, and has a size fitting snugly in chamber 44 within the annular wall 38g of the housing member. In the assembled relation of the damper, the face 40f of the bracket mounting plate is positioned against the surface 38a of the housing member and coacts with the housing member to seal the chamber 44.

Bracket plate 40 is maintained in fixed position against the surface 38a of housing member 38 utilizing a plurality of fastener devices in the form of bolts 48 passing through apertures 40g in the mounting plate for threaded engagement with threaded bores 38i provided in the housing member at circumferentially spaced locations in surrounding relation to cavity 44.

Diaphragm 42 is positioned in chamber 44 and divides the chamber into a first chamber portion 44a, between one side 42a of the diaphragm and housing member surface 38b, and a second chamber portion 44b, between the opposite side 42b of the diaphragm and the housing portion 40a of the bracket plate. Diaphragm 42 is clamped around its periphery between a wire ring 51 positioned in chamber 44b against surface 40f of the mounting bracket plate and a square cut elastomeric seal 52 positioned in groove 38h. The parts are sized and configured such that seal 48 is compressed as the face 42a of the diaphragm is moved into engagement with shoulder 38f by ring 51 in response to tightening of bolts 48, whereby to effectively seal chamber portion 44a from chamber portion 44b.

The diaphragm assembly 36 is mounted to the associated vehicle by positioning the bracket portion 40b of the mounting plate against a fixed portion of the associated vehicle such as the panel 50 and thereafter utilizing bolts 52 passing through apertures 40f in bracket arm portions 40d and 40e to fixedly mount the damper assembly on the panel 50 and thereby fixedly position the damper with respect to the vehicle.

It will be understood that the damper functions to attenuate vibrations transmitted backwardly through the system from the engine/clutch to the vehicle operator and that, specifically, hydraulic pulsations or vibrations transmitted through hose 14b and through port 38c to chamber 44a impact upon diaphragm 42 which flexes in a manner to attenuate the vibration so that the vibrations are not transmitted through port 38d and conduit 14a to the vehicle operator. It will further be understood that the clutch actuator is preferably provided to the motor vehicle manufacturer in a prefilled form with hydraulic fluid filling the liquid volumes of the master cylinder, the slave cylinder, the conduit portions, and the damper.

In the modified design seen in FIG. 7, the wire ring 46 is replaced by an annular upset portion 52 formed during the formation of bracket plate 40.

The invention damper will be seen to minimize the number of parts required to form the damper assembly, and thereby minimize the cost of the damper, and will further be seen to simplify the mounting of the damper assembly in the vehicle, thereby further reducing the effective cost of the damper. In this regard it will be seen that the invention embodies a method of providing a damper to dampen vibrations occurring in the hydraulic fluid in a hydraulic clutch actuator system for a vehicle wherein the housing portion of the mounting bracket plate is positioned against the face of the housing member to coact with the housing member to seal the chamber; the diaphragm is fixedly positioned in the chamber to divide the chamber into a first chamber portion between one side of the diaphragm and the housing member and communicating with the housing member port and a second chamber portion between the opposite side of the diaphragm and the housing portion of the bracket plate; the bracket portion is positioned against a fixed portion of the associated vehicle; and the mounting bracket plate is mounted to the fixed vehicle portion to fixedly position the damper with respect to the vehicle.

Whereas preferred embodiments of the invention have been illustrated and described in detail, it will be apparent that various changes may be made in the disclosed embodiments without departing from the scope or spirit of the invention.

What is claimed is:

1. A vibration damper for provision in a hydraulic actuator system between a master cylinder and a slave cylinder of the system, the damper including:

a housing member defining a chamber opening in one face of the housing member and accessible via a port in the housing member;

a mounting bracket plate including a housing portion corresponding in size and configuration to said one face of the housing member and positioned against said one face of the housing member to coact with the housing member to seal the chamber, and a bracket portion extending outwardly from the housing portion and including attachment means to facilitate mounting of the damper to a fixed structure; and a diaphragm fixedly positioned in the chamber and dividing the chamber into a first chamber portion between one side of the diaphragm and the housing member and communicating with the port and a second chamber portion between the opposite side of the diaphragm and the housing portion of the bracket plate.

2. A damper according to claim 1 wherein the mounting bracket plate is fixedly secured to the housing member by a plurality of fastener devices joining the housing member to the housing portion of the mounting bracket plate.

3. A damper according to claim 2 wherein the fastener devices comprise a plurality of threaded bores in the housing member in surrounding relation to the chamber and a corresponding plurality of bolts passing through apertures in the housing portion of the mounting plate for engagement with respective threaded bores in the housing member.

4. A damper according to claim 1 wherein:

the housing member and the housing portion of the bracket member have a circular configuration; and the bracket portion of the mounting plate extends radially outwardly from the housing portion at circumferentially spaced locations to allow mounting of the bracket portion to the fixed structure at spaced locations.

5. A clutch hydraulic actuator system having a vibration damper provided in the system between a master cylinder and a slave cylinder of the system, the damper including;

a housing member defining a chamber opening in one face of the housing member and port means in the housing member providing fluid communication between the chamber and the master cylinder and between the chamber and the slave cylinder;

a mounting bracket plate including a housing portion corresponding in size and configuration to said one face of the housing member and positioned against said one face of the housing member to coact with the housing member to seal the chamber, and a bracket portion extending outwardly from the housing portion and including attachment means to facilitate mounting of the damper to a fixed structure; and a diaphragm fixedly positioned in the chamber and dividing the chamber into a first chamber portion between one side of the diaphragm and the housing member and communicating with the port means and a second chamber portion between the opposite side of the diaphragm and the housing portion of the bracket plate.

6. An actuator system according to claim 5 wherein the actuator system is provided to the motor vehicle manufacturer in prefilled form with hydraulic fluid filling the fluid volumes in the master cylinder, slave cylinder, and damper.

7. An actuator according to claim 5 wherein the mounting bracket plate is fixedly secured to the housing member by a plurality of fastener devices joining the housing member to the bracket plate housing portion.

8. An actuator according to claim 7 wherein the fastener devices comprise a plurality of threaded bores in the housing member in surrounding relation to the chamber and a corresponding plurality of bolts passing through apertures in the housing portion of the mounting plate for engagement with respective threaded bores in the housing member.

9. An actuator according to claim 5 wherein:

the housing member and the housing portion of the mounting bracket plate have a circular configuration; and the bracket portion of the mounting bracket plate extends radially outwardly from the housing portion at circumferentially spaced locations to allow mounting of the bracket plate to the fixed structure at spaced locations.

10. A method of providing a damper to dampen vibrations occurring in hydraulic fluid in a hydraulic actuator system for a vehicle, the method comprising;

providing a housing member defining a chamber opening in one face of the housing member and accessible by a port in the housing member;

providing a mounting bracket plate including a housing portion corresponding in size and configuration to said one face of the housing member and a bracket portion extending outwardly from the housing portion and including attachment means;

positioning the housing portion of the mounting bracket against said one face of the housing member to coact with the housing member to seal the chamber;

fixedly positioning a diaphragm in the chamber to divide the chamber into a first chamber portion between one side of the diaphragm and the housing member and communicating with the housing member port and a second chamber portion between the opposite side of the diaphragm and the housing portion of the bracket plate; and positioning the bracket portion of the mounting bracket plate against a fixed portion of the associated vehicle and mounting the mounting bracket plate to the fixed vehicle portion to fixedly position the damper with respect to the vehicle.

* * * * *